(12) United States Patent
Butterworth (10) Patent No.: US 7,995,911 B2
(45) Date of Patent: Aug. 9, 2011

(54) MATCHING LED FLASH TO CAMERA'S AMBIENT LIGHT COMPENSATION ALGORITHM

(75) Inventor: Mark Butterworth, Santa Clara, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 375 days.

(21) Appl. No.: 12/359,374

(22) Filed: Jan. 26, 2009

(65) Prior Publication Data

US 2010/0189429 A1    Jul. 29, 2010

(51) Int. Cl.
    G03B 15/03    (2006.01)
(52) U.S. Cl. ........................................ 396/155
(58) Field of Classification Search ............ 396/155, 396/164, 173, 175; 348/370, 371
    See application file for complete search history.

(56) References Cited

U.S. PATENT DOCUMENTS

| | | | |
|---|---|---|---|
| 2005/0134723 A1* | 6/2005 | Lee et al. | 348/370 |
| 2005/0174473 A1* | 8/2005 | Morgan et al. | 348/370 |
| 2006/0082679 A1* | 4/2006 | Chua et al. | 348/371 |
| 2006/0176692 A1* | 8/2006 | Lee et al. | 362/231 |
| 2007/0040097 A1* | 2/2007 | Mok et al. | 250/208.1 |
| 2007/0057626 A1* | 3/2007 | Kurihara et al. | 313/503 |

FOREIGN PATENT DOCUMENTS

| | | |
|---|---|---|
| EP | 1453055 A1 | 9/2004 |
| GB | 2409287 A | 6/2005 |
| JP | 2003007103 A | 1/2003 |
| JP | 2008010556 A | 1/2008 |
| JP | 2009015308 A | 1/2009 |
| JP | 2004215025 A | 5/2009 |

OTHER PUBLICATIONS

International Search Reprot Attached. PCT/IB2010/050105.

* cited by examiner

*Primary Examiner* — W. B. Perkey
*Assistant Examiner* — Warren K Fenwick (57) ABSTRACT

A white light LED flash for a digital camera is described that uses a blue light LED die in conjunction with red and green phosphor or quantum dot material over the LED die. The phosphor or quantum dot characteristics are selected so that the white light substantially matches an ambient light setting in the camera, such as the incandescent ambient light setting. Therefore, when a flash picture is taken under incandescent ambient light, and the flash emits the same type of light as the incandescent light, the flash will effectively brighten the incandescent light. The camera's color compensation algorithm associated with incandescent light illumination is then applied to the photograph and works optimally since the image is only illuminated by incandescent light. This concept is expanded to LED flashes that emulate other types of ambient light having associated color compensation algorithms programmed into the camera.

13 Claims, 6 Drawing Sheets

LED design

- Identify light characteristics a particular camera type uses to determine that ambient light is incandescent (tungsten filament), and, as a result, then color-compensates photographed image taken under incandescent ambient light — 58

- Customize phosphor densities, thicknesses, ratios, types, etc. over a blue LED to create a customized white light LED to match the incandescent light characteristics already programmed in the particular camera — 59

- Mount the white light LED in camera body for substantially replicating, when energized, the ambient incandescent light characteristics programmed in the particular camera — 60

Camera operation

- Open shutter and process image to determine type of ambient light or use separate light sensor (ambient light when using flash will typically be incandescent) — 66

- If flash enabled, drive the white light LED to add to the incandescent ambient light — 72

- Process image illuminated by ambient light and LED flash, including applying color correction factors based on detected ambient incandescent light — 76

- Save color-corrected image in memory — 80

MATCHING LED FLASH TO CAMERA'S AMBIENT LIGHT COMPENSATION ALGORITHM

FIELD OF THE INVENTION

The present invention relates to digital camera flashes using light emitting diodes (LEDs) and, in particular, to an LED flash whose light characteristics are customized to match an existing ambient light compensation algorithm performed by the camera.

BACKGROUND OF THE INVENTION

The colors of an image to be photographed are highly affected by the ambient light. A warm ambient light is considered more red and less blue compared to a cool ambient light. A warm ambient light may be an incandescent light, such as using a tungsten filament (about 3000K). Morning or afternoon sun produces less warm ambient light (about 3500K). A cooler ambient light is a fluorescent light (about 4500K). Overhead-sun daylight, cloudy daylight, and shady daylight produce progressively cooler light (5000-10000K). A standard xenon flash produces a cool light (about 5500K) that tends to dominate the ambient light.

High quality digital cameras are manually controllable to select the type of existing ambient light. As a result of the selection, a particular compensation algorithm is performed on the color pixels to compensate for the color bias created by the ambient light so that the picture colors are truer.

Some digital camera can automatically detect the type of ambient light by color balance and other techniques. As a result, the camera's processor applies the appropriate one of a number of color compensation algorithms to correct any color bias due to the detected ambient light.

When a standard xenon flash is used in a camera, the camera assumes that the flash dominates the ambient light, and the color compensation algorithm selected by the camera is sometimes that associated with the use of flash. In certain situations, however, the flash and ambient light both substantially contribute to the image's illumination.

LEDs are becoming increasingly popular for use as a flash for small cameras, including cell phone cameras. This is because the LEDs do not need a high voltage pulse, required for a xenon flash, and the LED and its driver are much smaller than the xenon bulb and its driver. An LED may also be continuously turned on when taking a video using a digital camera.

Flash LEDs used today are typically a standard blue LED die covered with a YAG phosphor, where the yellow-green light emitted by the YAG phosphor is combined with the blue LED light leaking through the phosphor layer to produce a white light. The light is considered a cool light, with a color temperature of around 7000K.

A problem with LED flashes is that the flash color temperature does not match the ambient color temperature. Therefore, the image is illuminated by the combination of two light sources of different characteristics. Since the various automatic color compensation algorithms stored in the camera are specifically tailored to particular types of ambient light or to the flash by itself, even the most appropriate color compensation algorithm selected will not accurately compensate for the two very different illuminating light sources.

What is needed in the field of digital camera flashes is a flash system that works well in conjunction with the camera's color compensations algorithms to produce a picture with truer colors.

SUMMARY OF THE INVENTION

An object of the invention is to provide an LED flash that is similar to the actual ambient light illuminating an object, such as an object to be photographed. In this way, the flash effectively brightens the ambient light. Since each different color compensation algorithm in a camera, such as in a cell phone camera, is designed to compensate for only one type of ambient light, the color compensation algorithm selected for the actual ambient light works optimally when the LED flash substantially matches the actual ambient light.

The invention may be performed by a digital device, such as a camera, by determining that ambient light illuminating an object is a first type of ambient light, such as an incandescent light. Then energizing a first white light, light emitting diode (LED) flash, the first white light LED flash including a first LED die that emits visible blue light. Over the first LED die is a first wavelength conversion material, such as a red phosphor, the first wavelength conversion material being energized by the blue light and wavelength converting the blue light to emit a visible red light. Also over the first LED die is a second wavelength conversion material, such as a green phosphor, the second wavelength conversion material being energized by the blue light and wavelength converting the blue light to emit a visible green light, wherein the combination of the blue light, red light, and green light produces a white light that substantially matches the first type of ambient light. Thus, the actual ambient light is effectively brightened by the LED flash.

If the device is a camera, one of a plurality of color compensation algorithms is selected based on the detected type of ambient light, and the color compensation algorithm associated with the first type of ambient light is applied to the photograph. Since there is only one type of illuminating light for the object, the color compensation algorithm works optimally.

The invention can be extended to providing multiple LED flashes in a device, such as a camera, and only the LED flash that produces a light that substantially matches the actual ambient light is used for the final photograph along with the associated color compensation algorithm.

DETAILED DESCRIPTION

An LED flash is fabricated for a particular camera using an LED die and phosphors over the die to produce a white light whose light characteristics are customized to substantially match one of the ambient light settings programmed into the camera. Each camera manufacturer may have their own standard for an ambient light type (e.g., incandescent light is 2500K vs. 3000K), so the LED flash is customized to substantially match one of the existing ambient light criteria for the camera.

The inventor has performed tests (using a color chart and the delta E94 standard) comparing color errors for different color temperatures of ambient light. The inventor has found that, when the camera is set to use its incandescent light (tungsten filament) color correction algorithm, the lowest color error is produced when the LED flash is customized to substantially emit the same color temperature (about 2700K) as the tungsten filament. The test also showed that the highest color error is produced by the camera using a standard YAG type LED flash while the camera was calibrated for the tungsten filament ambient light.

In the field of small digital cameras, a majority of the flash pictures are taken indoors under incandescent lighting. Therefore, an important color compensation algorithm for flash pictures is for incandescent lighting. When the LED flash is fabricated to substantially reproduce the tungsten filament light standard used by the camera, the combination of the actual tungsten filament ambient light and the LED flash will essentially produce a brighter tungsten filament illumination. The camera may use an automatic ambient light detector to determine the type of ambient light, or the user may manually identify the type of ambient light. As a result, the flash picture, taken indoors under incandescent light, will be truer in the invention than had the LED flash been a YAG type flash or other arbitrarily designed flash.

The color emission of the LED flash may be adjusted for the camera's incandescent light standard by varying the densities, thicknesses, ratios and/or types of red and green phosphors over the blue LED die. The phosphors may be deposited as a combined layer, or may be deposited as separate layers, or may be in the form of thin preformed plates affixed to the LED die. In one embodiment, the phosphors are deposited by electrophoresis. Quantum dots or other wavelength-conversion materials may also be used.

In another embodiment, the LED flash emulates another type of ambient light, such as daylight or fluorescent light.

In another embodiment, a different LED flash is customized for each of the various ambient light types detectable by the camera, such as incandescent, fluorescent, bright daylight, and cloudy daylight. The different LED flashes are then mounted next to each other in the camera. When a flash picture is to be taken, the type of ambient light is automatically detected or manually entered, then only the LED that emits substantially the same color temperature as the detected ambient light is energized for the photograph. Therefore, the camera's color compensation algorithm for that light type will work optimally to produce a truer picture.

Many other scenarios of operation of the LED flashes may be used so that the final picture will be that taken with the LED flash that most resembles the ambient light.

Figure 1:
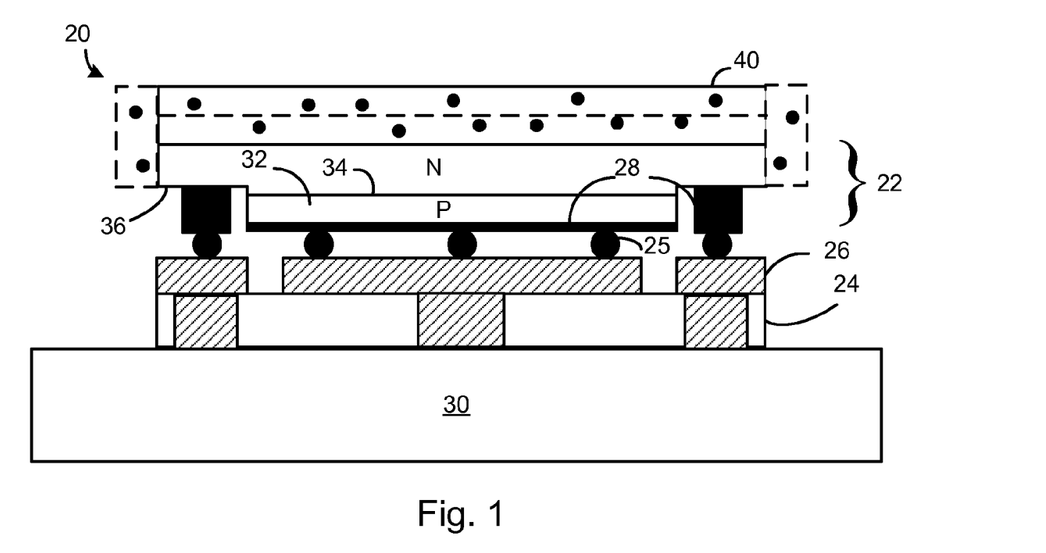
FIG. 1 is a cross-sectional view of a blue AlInGaN LED die, mounted on a submount, with one or more overlying wavelength conversion layers, such as formed of phosphors or quantum dots, that are customized to create a white light LED whose light emission substantially matches an ambient light standard (e.g., incandescent) programmed into a digital camera.

FIG. 1 is a cross-sectional view of a white light LED 20 formed in accordance with one embodiment of the invention. A high power blue light LED die 22 is soldered or ultrasonically welded to a submount 24 using gold bumps 25 or any other means. The submount 24 has metal contact pads 26 on its surface to which the bottom electrodes 28 on the LED die 22 are electrically connected. The LED die 22 is a flip-chip. The contact pads 26 lead to other conductors formed on the periphery or underside of the submount 24 for connection to a printed circuit board 30, which is in turn connected to a power supply such as a current source. The LED die 22 may be formed using AlInGaN materials and preferably emits blue light that has a peak wavelength of about 430-480 nm. The die 22 comprises a bottom p-layer 32, an active layer 34, and a top n-layer 36. Each layer may include a plurality of layers. In other embodiments, the location of n and p layers may be reversed, and the device may be a non-flip-chip. The top surface of the blue LED die may be any size, with typical sizes being about 1 mm$^2$.

Affixed to the top surface of the LED die 22 are one or more phosphor layers 40 containing a red phosphor and a green phosphor. Quantum dots may be used for the down-conversion instead of phosphors, although phosphors will be used in the examples. The one or more phosphor layers 40 may be preformed thin phosphor plates, or layers deposited by methods such as depositing the phosphors in a liquid binder or electrophoresis. The dashed lines through the phosphor layers 40 indicate variations where the phosphors are deposited as two layers, or the phosphors cover the sides of the LED die 22, or the phosphors only cover the top surface of the die such as with phosphor plates. A combination of a plate and a deposition may also be used. Methods of depositing phosphors to create a wide variety of while light spectra are well known.

Some blue light leaks through the red and green phosphor, so the resulting light is white.

Some of the many examples of suitable red and green phosphors include: $Y_3Al_5O_{12}:Cu^{3-}$ (green); $CaAlSiN_3:Eu^{2+}$ (red); $Lu_3Al_5O_{12}:Ce^{3-}$ (green); and $(BaSr)_2Si_5N_8:Eu^{2+}$ (red, known as BSSN). Any combination of red and green phosphors may be used.

If phosphor plates are used, the thickness of each plate or the combined plate is typically between 50-300 microns, depending on the type of phosphor used, the type of blue LED used (e.g., higher power LEDs may need thicker plates), the density of the phosphor, and other factors which would be understood by those in the art.

The plate may be sintered phosphor powder or phosphor powder disbursed in a transparent binder, such as silicone. Or, it may comprise semiconductor nanoparticles (quantum dots) embedded into a suitable matrix such as epoxy or silicone. Or, it may be a hybrid (e.g., phosphor in a binder where the binder contains semiconductor nanoparticles). Quantum dots wavelength-convert light to a particular wavelength dependent on the size of the quantum dot particles. Such quantum dots and their properties needed to create a particular red or green light emission are well known.

If overlapping red and green plates or layers are used, placing the red phosphor beneath the green phosphor is advantageous because the red down-converter generally absorbs the green photons, while the green down-converter does not significantly affect the red photons. This tends to result in improved down-conversion efficiency.

The invention relates to customizing the red and green phosphors (or other wavelength conversion material) energized by a blue LED die so that the emitted white light substantially matches to a particular color compensation algorithm used in a digital camera to compensate for the ambient light characteristics. The white light LED is then used as a camera flash. If the LED flash is customized to substantially match one of the existing ambient light types programmed into the camera, then the LED flash effectively brightens the ambient light, and the camera's color compensation algorithm for that particular type of ambient light works optimally to create truer picture colors.

In one embodiment, multiple different LED flashes are used in a single camera, each corresponding to a different ambient light. In a simpler embodiment, such as a cell phone camera flash, the LED flash is customized to substantially match the incandescent (tungsten filament) ambient light assumed by the camera in the camera's incandescent light color compensation algorithm.

Figure 2:
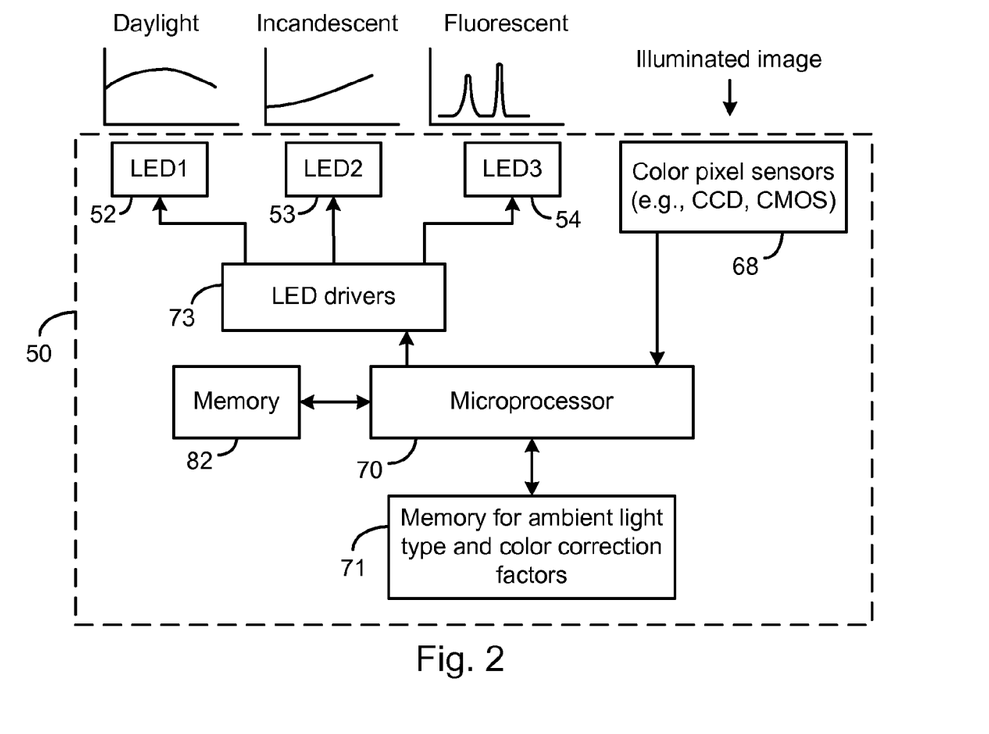
FIG. 2 illustrates a digital camera in accordance with one embodiment of the invention using one or more white light LED flashes that have been customized for the particular color compensation algorithms used by the camera for different ambient light.

FIG. 2 illustrates a camera 50 that includes multiple LED flashes 52, 53, and 54. As used herein, the term flash also includes a continuous illumination during a video rather than a single picture. LED flash 52 is custom designed for substantially matching a bright-daylight ambient light camera setting, LED flash 53 is custom designed for substantially matching an incandescent ambient light camera setting, and LED flash 54 is custom designed for substantially matching a fluorescent ambient light camera setting. There may be additional LED flashes for other light settings. Above each LED flash is a simplified graph of the wavelength (x-axis) versus relative intensity of the light emitted by the LED flash, where the wavelength increases from blue on the left to red on the right. For a fluorescent light, the emission is due to specific emissions of the phosphors used. Such characteristics of each type of ambient light assumed by the camera's color compensation algorithms may be provided by each camera manufacture who desires to have fabricated customized LED flashes in accordance with the present invention. The overall color temperature of the incandescent ambient light is assumed to be 2500K-4000K; the overall color temperature of the fluorescent ambient light is assumed to be 4000K-5000K; and the overall color temperature of the daylight ambient light is assumed to be 5000K-6500K.

The camera's ambient light setting, for the purpose of selecting a particular color compensation algorithm, may be manual or automatic.

Most cellular telephone cameras use the LED flash under incandescent ambient light. In the simplest scenario of the invention, only an LED flash that substantially matches the camera's incandescent ambient light setting is fabricated for a certain camera maker. In this way, when the flash is used along with incandescent ambient light, the camera's incandescent light color compensation algorithm will be optimally applied to a photograph, since all the illumination of the image has incandescent light characteristics. This technique is described in the flowchart of FIG. 3. The flowchart is separated into the LED flash design and the camera operation.

Figure 3:
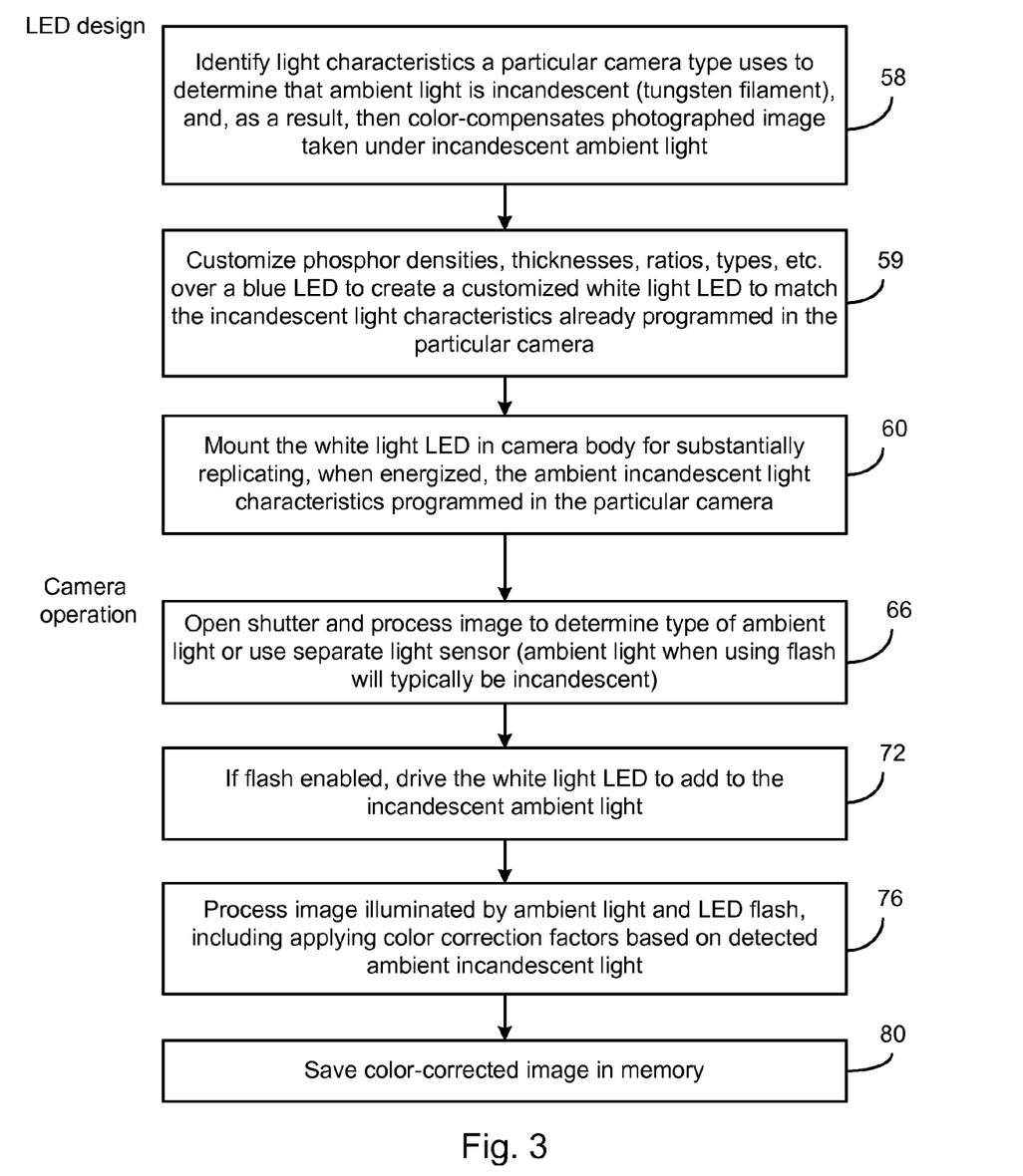
FIG. 3 is a flowchart describing the customized fabrication of a white light LED whose light emission substantially matches an incandescent emission spectrum and describing the operation of a digital camera incorporating the white light LED flash.

In step 58 of FIG. 3, the LED manufacturer identifies the light characteristics a particular camera type uses to determine that ambient light is incandescent (tungsten filament). Such a camera would have a color compensation algorithm that is applied to a photograph taken under such incandescent ambient light.

In step 59, the LED manufacturer then customizes the red and green phosphor characteristics for a particular blue LED die to create customized a white light LED to match the incandescent light characteristics already programmed in the particular camera. Such customization may entail varying one or more of the following phosphor characteristics: densities, thicknesses, ratios, types, and perhaps other factors. The deposition method will also affect the white light characteristics. In one embodiment, the red phosphor is a thin pre-formed phosphor plate, and a particular plate is selected from other plates having different thicknesses to achieve a desired red light component. Similarly, a green plate is selected from a plurality of different plates to achieve a desired green component. The thicknesses of the plates also affect the blue light component since the blue component is the LED light that leaks through the plates. The light characteristics achieved by the various combinations of plates and blue LEDs, driven at a particular drive current, may be determined empirically or by computer simulation.

In step 60, the resulting LED flash is mounted in the camera for substantially replicating the ambient incandescent light characteristics programmed in the particular camera.

Figure 4:
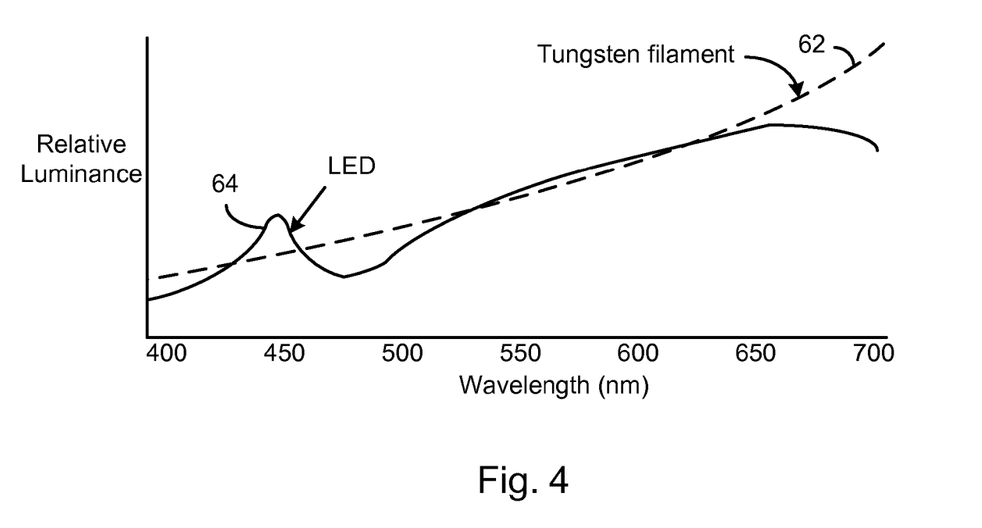
FIG. 4 illustrates the spectrum of a typical tungsten filament, whose characteristics are programmed into a digital camera for color compensation when such a filament is used as the ambient light source, and illustrates a simplified spectrum of a white light LED that is customized to substantially match the spectrum of the filament.

FIG. 4 illustrates a spectrum 62 of a typical tungsten filament, whose characteristics are programmed into a digital camera for color compensation when such a filament is used as the ambient light source. FIG. 4 also illustrate the simplified spectrum 64 of the white light LED 53 (FIG. 2) customized to substantially match the spectrum of the filament. The bump in relative luminance of the LED light at the blue wavelength of about 450 nm is due to the blue light of the LED die leaking through the red and green phosphors. As long as the LED flash characteristics generally track the ambient light characteristics (as sensed by the camera), the LED flash is considered to substantially match the ambient light. Different phosphors have different full-wavelength-half-maximum characteristics, which affect the smoothness of the LED flash characteristics. However, since the camera essentially only detects red, green, and blue light, the LED flash does not need to resemble the entire spectrum of the ambient light, as long as the camera perceives the LED flash as simply adding to the brightness of the ambient light.

In step 66 of FIG. 3, assuming the camera automatically detects the type of ambient light, the camera "opens the shutter" (in the electronic sense), and the camera's color pixel sensors 68 detect the illuminated image without the flash, such as at a low resolution. The sensors 68 may be CCD, CMOS, or other type of sensors. The camera's microprocessor 70 processes the image to determine the type of ambient light, such as by comparing the characteristics to stored characteristics in a memory 71. The camera may even use a separate light sensor to sense the overall color temperature. In another embodiment, the user manually identifies the type of ambient light via the camera's menu screen.

In step 72, assuming the camera detects that the ambient light is insufficiently bright to take a picture, the camera enables the LED flash, and the picture is taken. If the ambient light is incandescent light, the LED flash only adds to the ambient light brightness without substantially changing the colors. To energize the LED flash 53, the microprocessor 70 applies a signal to an LED driver 73, which applies a current pulse (for a picture) or a continuous current (for a video) to the LED flash 53. LED drivers for flashes are well known and commercially available.

In step 76, assuming the ambient light was detected as being incandescent light, the camera processes the image using the incandescent ambient light color compensation setting, so that the color compensation algorithm works optimally. The color correction factors (including color shift and brightness) may be stored in the memory 71 addressed by the microprocessor 70. If the ambient light was not incandescent light and the LED flash was used, the resulting illumination will be a combination of the actual ambient light and the LED flash. The camera may apply a color compensation algorithm that is associated with the LED flash if the illuminating light is dominated by the LED flash, or the camera may apply another color compensation algorithm that takes into account the mixture of the LED flash and the actual ambient light.

In step 80, the color-corrected picture is stored in a memory 82, such as a memory card.

The flowchart of FIG. 3 produces optimal results when the picture is taken in incandescent ambient light using a flash. For a higher quality cameras, multiple LED flashes 52-54 may be mounted in the same area (e.g., reflector), and only the flash that corresponds to the detected ambient light is used for the final picture.

Figure 5:
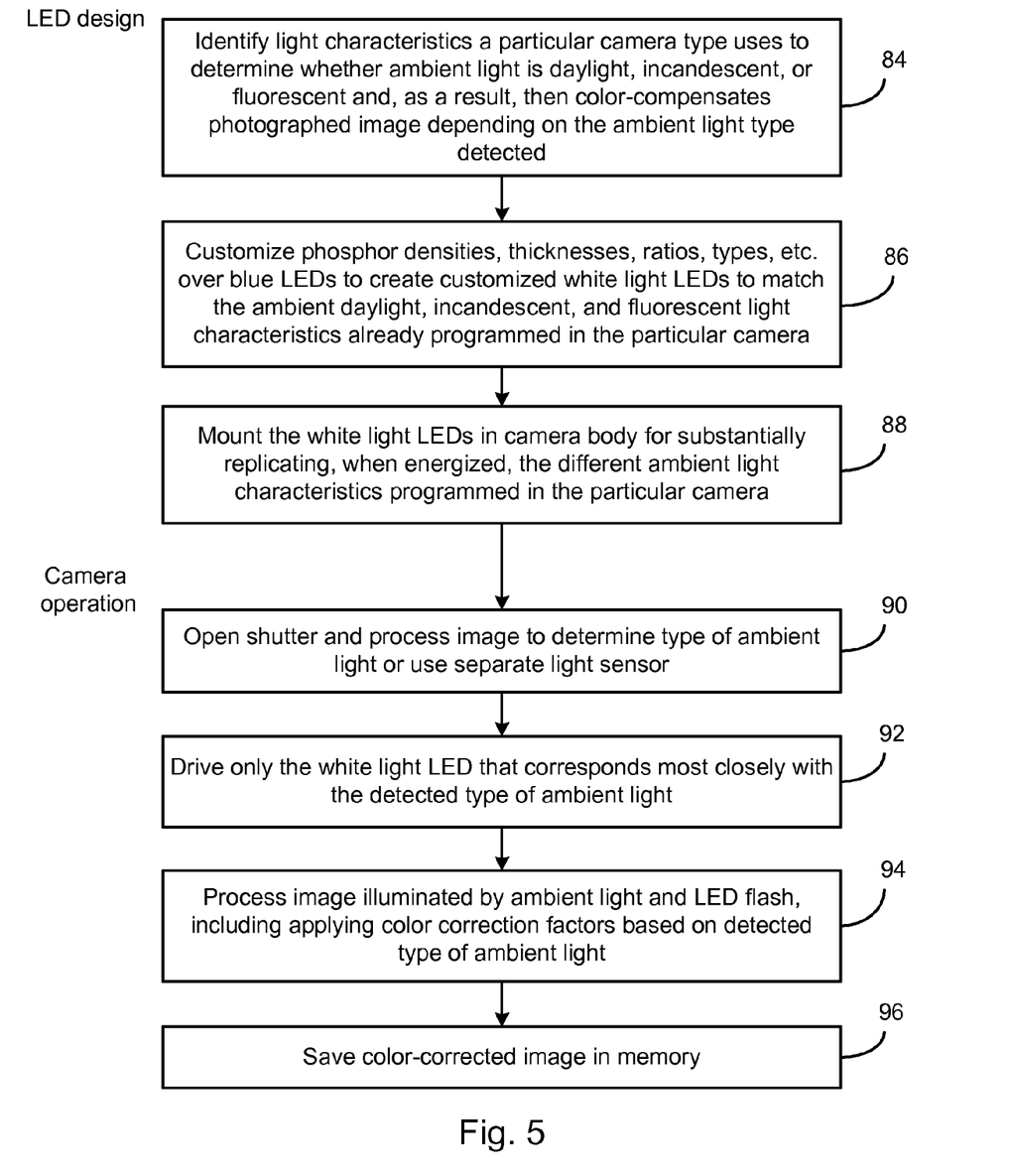
FIG. 5 is a flowchart describing the customized fabrication of multiple white light LED flashes, whose light emissions substantially match those of different ambient light sources, and describing the operation of a digital camera incorporating the multiple white light LED flashes.

FIG. 5 is a flowchart that entails multiple LED flashes mounted in the camera. It is assumed that the camera settings include at least daylight (sunny, sun overhead), incandescent, and fluorescent. There may be more or fewer settings and flashes.

In step 84 of FIG. 5, the light characteristics a particular camera type uses to determine whether ambient light is daylight, incandescent, or fluorescent are identified. Such a determination by the camera then applies the associated color compensation algorithm used to color-compensate the photographed image. Such characteristics may be provided by the camera manufacturer to the LED flash manufacturer.

In step, 86, LED flashes are fabricated to substantially match the daylight, incandescent, and fluorescent characteristics identified in step 84. Simplified examples of such characteristics are shown in FIG. 2 above the LED flashes 52-54.

In step 88, the three LED flashes are mounted in a digital camera.

Various camera techniques may then be used to combine the LED flash with the ambient light and select the optimum color correction algorithm to apply to the photograph. In the example of FIG. 5, in step 90, the ambient light is detected such as by "opening" the shutter (performed electronically rather than mechanically) to detect the ambient light by comparing the actual ambient light characteristics to the stored ambient light characteristics in memory 71. The ambient light may also be simply identified by the user.

In step 92, only the LED flash 52-54 most closely associated with the detected ambient light type is energized for taking a flash picture. The microprocessor 70 identifies the appropriate flash to the LED driver 73, which then applies a current pulse or continuous current to the selected LED.

In step 94, the image illuminated by the ambient light and matching LED flash is then processed using the appropriate color correction factors for that ambient light. Thus, the algorithm will be optimally applied.

In step 96, the final picture is stored in the memory 82.

Figure 6:
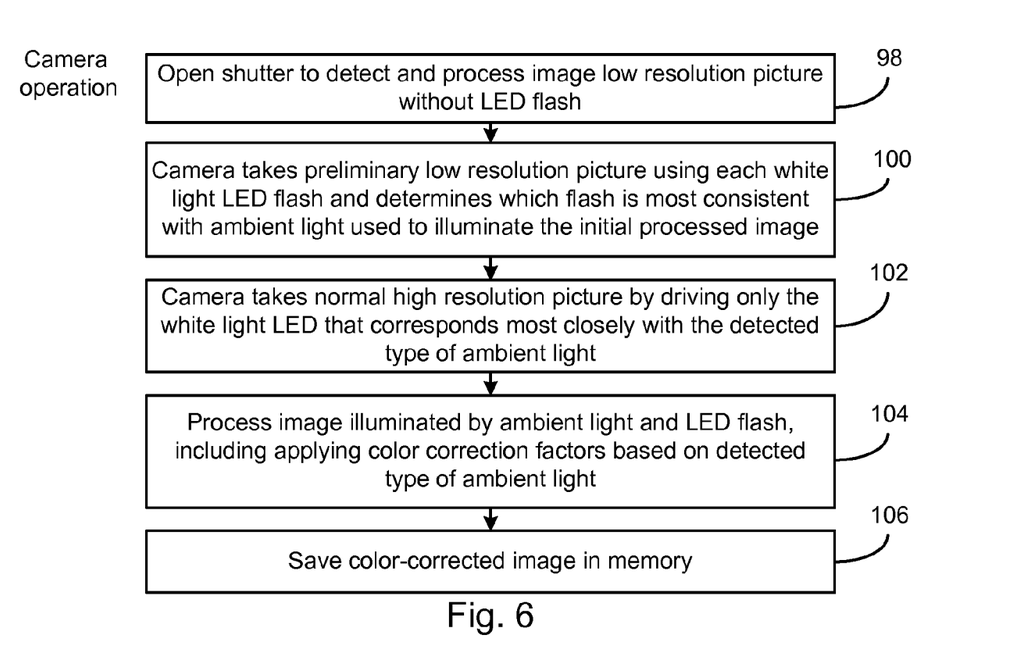
FIG. 6 is a flowchart describing another embodiment of a camera operation using the customized white light LEDs of FIG. 5.

FIG. 6 illustrates another example of camera operation using the LED flashes fabricated in FIG. 5. In step 98 of FIG. 6, the camera shutter is opened to process a low resolution picture using only the ambient light.

In step 100, the camera takes a separate picture at low resolution with each of the three flashes 52-54 and determines which flash produced an image most consistent with the ambient light detected in step 98.

In step 102, the camera then takes a normal picture using the LED flash that most matches the ambient light.

In step 104, the photograph is color compensated using the algorithm associated with the ambient light. Thus, the algorithm will be optimally applied.

In step 106, the color corrected image is stored in the memory 82.

Figure 7:
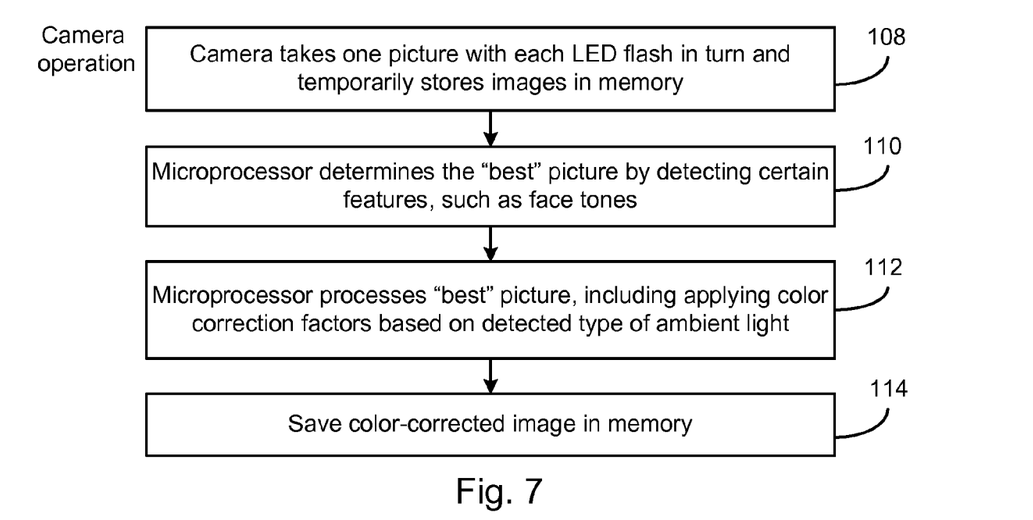
FIG. 7 is a flowchart describing yet another embodiment of a camera operation using the customized white light LEDs of FIG. 5.

FIG. 7 illustrates another example of camera operation using the LED flashes fabricated in FIG. 5. In step 108 of FIG. 7, the camera takes one picture with each flash in turn and temporarily stores the pictures in memory.

In step 110, the microprocessor 70 determines the best picture by, for example, examining face tones or using other standards.

In step 112, the camera then applies the appropriate color correction algorithm, based on the detected ambient light, to the best picture and deletes the remaining pictures.

In step 114, the color corrected image is stored in the memory 82.

Figure 8:
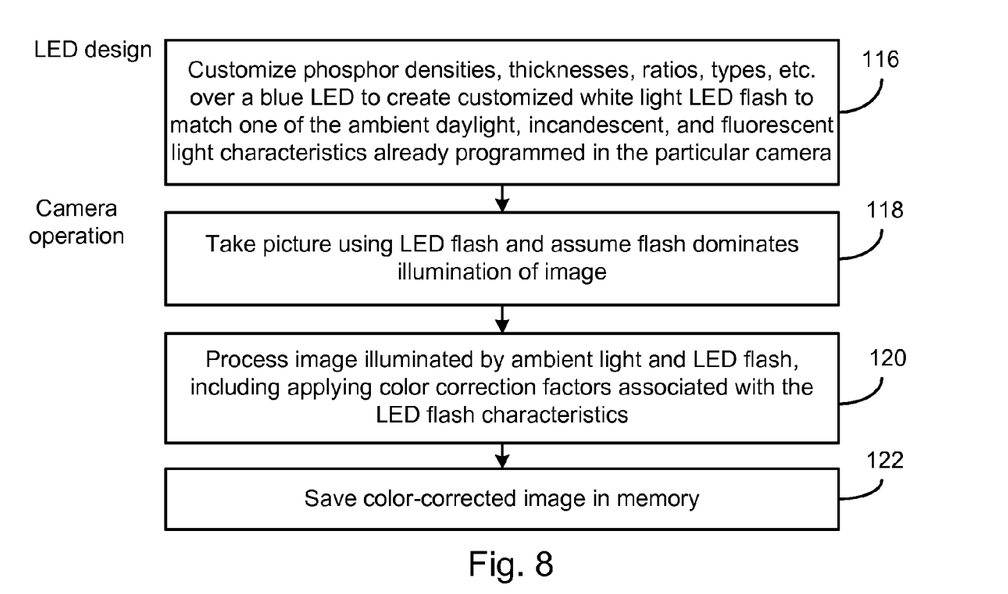
FIG. 8 is a flowchart describing another embodiment of the customized fabrication of a white light LED flash, whose light emission substantially matches a certain emission spectrum, and describing the operation of a digital camera incorporating the white light LED flash.

FIG. 8 illustrates another technique that assumes that the LED flash dominates the image illumination, and the camera applies the color correction algorithm associated with the LED flash (e.g., the incandescent light algorithm) without concern for the actual ambient light. This assumes the ambient light is insufficiently bright so as to require a flash.

In step 116 of FIG. 8, the phosphor densities, thicknesses, types, etc. over a blue LED are adjusted to create a customized white light LED flash to match one of the ambient daylight, incandescent, and fluorescent light characteristics already programmed in the particular camera.

In step 118, upon detection that a flash is needed, a picture is taken, and it is assumed that the flash dominates the image illumination.

In step 120, the photograph is color corrected with the color compensation algorithm associated with the LED flash characteristics. In one embodiment, the LED flash has incandescent light characteristics, since most flash pictures are taken indoors with incandescent ambient light.

In step 122, the color corrected image is stored in the memory 82.

As in all embodiments, brightness compensation maybe achieved by a combination of the shutter opening time and a compensation algorithm.

Various combinations of the methods described herein may be used to process the photograph taken with the one or more customized LED flashes. The processes are simplified if the user manually identifies the ambient light.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is being claimed is:

1. A method of operating a digital camera, the camera storing a plurality of color compensation algorithms, each color compensation algorithm being associated with a different type of illuminating light, each color compensation algorithm being tailored for a type of illuminating light having pre-programmed color temperature characteristics, the method comprising:

determining that actual ambient light illuminating an object is a first type of ambient light;

selecting at least one of a plurality of white light, light emitting diode (LED) flashes based on detecting that the ambient light is the first type of ambient light, the LED flashes being associated with different types of ambient light;

energizing a selected first white light LED flash, associated with the first type of ambient light, to further illuminate the object, the first white light LED flash comprising:
 a first LED die that emits visible blue light;
 a first wavelength conversion material over the first LED die, the first wavelength conversion material being energized by the blue light and wavelength converting the blue light to emit a visible red light; and
 a second wavelength conversion material over the first LED die, the second wavelength conversion material being energized by the blue light and wavelength converting the blue light to emit a visible green light, wherein the combination of the blue light, red light, and green light produces a white light that substantially matches the pre-programmed color temperature characteristics of the first type of ambient light stored in the camera irrespective of the characteristics of the actual ambient light;

taking a photograph by the camera of the object illuminated by the first type of ambient light and light from the first white light LED flash;

selecting one of the plurality of color compensation algorithms stored in the camera associated with the first type of ambient light; and applying the selected color compensation algorithm associated with the first type of ambient light to the photograph.

2. The method of claim 1 where the first type of ambient light is incandescent light having a color temperature between 2500K-4000K.

3. The method of claim 1 wherein at least one of the algorithms is associated with a second type of ambient light, the method further comprising:
 determining that actual ambient light illuminating an object is the second type of ambient light;
 selecting a second white light LED flash based on detecting that the ambient light is the second type of ambient light;
 energizing the selected second white light LED flash, the second white light LED flash comprising:
  a second LED die that emits visible blue light;
  a first wavelength conversion material over the second LED die, the first wavelength conversion material being energized by the blue light and wavelength converting the blue light to emit a visible red light; and
  a second wavelength conversion material over the second LED die, the second wavelength conversion material being energized by the blue light and wavelength converting the blue light to emit a visible green light, wherein the combination of the blue light, red light, and green light produces a white light that substantially matches the pre-programmed color temperature characteristics of the second type of ambient light stored in the camera irrespective of the characteristics of the actual ambient light;
 taking a photograph by the camera of the object illuminated by the second type of ambient light and light from the second white light LED flash;
 selecting one of the plurality of color compensation algorithms stored in the camera associated with the second type of ambient light; and
 applying the color compensation algorithm associated with the second type of ambient light to the photograph.

4. The method of claim 3 where the second type of ambient light is daylight having a color temperature between 5000K-6500K.

5. The method of claim 3 where the second type of ambient light is fluorescent light having a color temperature between 4000K-5000K.

6. The method of claim 3 further comprising energizing the first white light LED flash and the second white light LED flash at different times while taking a photograph and selecting a resulting picture based upon which picture has truer colors.

7. A digital camera device comprising:
 a processor programmed to apply a color compensation algorithm to a picture taken under a particular ambient light;
 a memory containing a plurality of color compensation algorithms, each algorithm being associated with a different type of ambient light, each algorithm being tailored for a type of illuminating light having pre-programmed color temperature characteristics, at least one of the algorithms being tailored for a type of illuminating light having pre-programmed color temperature characteristics associated with incandescent ambient light, and at least one of the algorithms being tailored for a type of illuminating light having pre-programmed color temperature characteristics associated with light other than incandescent ambient light;
 a first white light, light emitting diode (LED) flash, the first white light LED flash comprising:
  a first LED die that emits visible blue light;
  a first wavelength conversion material over the first LED die, the first wavelength conversion material being energized by the blue light and wavelength converting the blue light to emit a visible red light; and
  a second wavelength conversion material over the first LED die, the second wavelength conversion material being energized by the blue light and wavelength converting the blue light to emit a visible green light, wherein the combination of the blue light, red light, and green light produces a white light having a color temperature between 2500K-4000K to substantially match pre-programmed color temperature characteristics associated with incandescent light irrespective of the characteristics of the actual ambient light;
 a second white light LED flash, the second white light LED flash comprising:
  a second LED die that emits visible blue light;
  the first wavelength conversion material over the second LED die, the first wavelength conversion material being energized by the blue light and wavelength converting the blue light to emit a visible red light; and
  the second wavelength conversion material over the second LED die, the second wavelength conversion material being energized by the blue light and wavelength converting the blue light to emit a visible green light, wherein the combination of the blue light, red light, and green light produces a white light having a color temperature that substantially matches pre-programmed color temperature characteristics associated with light other than incandescent light irrespective of the characteristics of the actual ambient light,
 the processor being programmed to apply the color compensation algorithm associated with incandescent light to a picture when an object is illuminated by incandescent ambient light and the first white light LED flash, and the processor being programmed to apply the color compensation algorithm associated with light other than incandescent light to a picture when an object is illuminated by other than incandescent ambient light and the second white light LED flash.

8. The camera device of claim 7 wherein at least one of the algorithms is associated with daylight ambient light, and wherein the second white light LED flash produces a white light having a color temperature between 5000K-6500K to substantially match characteristics of daylight, the camera further comprising:
the processor being programmed to apply the color compensation algorithm associated with daylight to a picture when an object is illuminated by daylight ambient light and the second white light LED.

9. The camera device of claim 7 wherein at least one of the algorithms is associated with fluorescent ambient light, the camera further comprising:
a third white light LED flash, the third white light LED flash comprising:
a third LED die that emits visible blue light;
the first wavelength conversion material over the third LED die, the first wavelength conversion material being energized by the blue light and wavelength converting the blue light to emit a visible red light; and
a second wavelength conversion material over the third LED die, the second wavelength conversion material being energized by the blue light and wavelength converting the blue light to emit a visible green light, wherein the combination of the blue light, red light, and green light produces a white light having a color temperature between 4000K-5000K to substantially match characteristics of fluorescent light;
the processor being programmed to apply the color compensation algorithm associated with fluorescent light to a picture when an object is illuminated by fluorescent ambient light and the third white light LED.

10. A method for providing a light emitting diode (LED) flash for a digital camera comprising:
identifying criteria used by a digital camera to determine that ambient light meets pre-programmed incandescent light characteristics in order to enable the camera to apply a color compensation algorithm associated with incandescent ambient light to a photograph of an object illuminated with the ambient light;
providing a first white light LED for use as a flash in the digital camera, wherein light characteristics of the first white light LED are selected to substantially match the pre-programmed incandescent ambient light characteristics, wherein the first white light LED is fabricated using a method comprising:
providing a first light emitting diode (LED) die that emits visible blue light;
providing a first wavelength conversion material over the first LED die, the first wavelength conversion material being energized by the blue light and wavelength converting the blue light to emit a visible red light;
providing a second wavelength conversion material over the first LED die, the second wavelength conversion material being energized by the blue light and wavelength converting the blue light to emit a visible green light, wherein the combination of the blue light, red light, and green light produces a white light having a color temperature of between 2500K-4000K to substantially match the pre-programmed incandescent light characteristics irrespective of the characteristics of the actual ambient light;
identifying criteria used by the digital camera to determine that ambient light meets pre-programmed daylight characteristics in order to enable the camera to apply a color compensation algorithm associated with daylight ambient light to a photograph of an object illuminated with the daylight ambient light;
providing a second white light LED for use as a flash in the digital camera, wherein light characteristics of the second white light LED are selected to substantially match the pre-programmed daylight characteristics, wherein the second white light LED is fabricated using a method comprising:
providing a second LED die that emits visible blue light;
providing the first wavelength conversion material over the second LED die, the first wavelength conversion material being energized by the blue light and wavelength converting the blue light to emit a visible red light; and
providing a second wavelength conversion material over the second LED die, the second wavelength conversion material being energized by the blue light and wavelength converting the blue light to emit a visible green light, wherein the combination of the blue light, red light, and green light produces a white light having a color temperature of between 5000K-6500K to substantially match the pre-programmed daylight characteristics irrespective of the characteristics of the actual ambient light.

11. The method of claim 10 further comprising incorporating the first white light LED and the second white light LED in the same digital camera.

12. The method of claim 10 further comprising:
identifying criteria used by a digital camera to determine that ambient light has fluorescent light characteristics in order to enable the camera to apply a color compensation algorithm associated with fluorescent ambient light to a photograph of an object illuminated with the fluorescent ambient light;
providing a third white light LED for use as a flash in the digital camera, wherein light characteristics of the third white light LED are selected to substantially match the fluorescent light characteristics, wherein the third white light LED is fabricated using a method comprising:
providing a third LED die that emits visible blue light;
providing the first wavelength conversion material over the third LED die, the first wavelength conversion material being energized by the blue light and wavelength converting the blue light to emit a visible red light; and
providing a second wavelength conversion material over the third LED die, the second wavelength conversion material being energized by the blue light and wavelength converting the blue light to emit a visible green light, wherein the combination of the blue light, red light, and green light produces a white light having a color temperature of between 4000K-5000K to substantially match the fluorescent light characteristics.

13. The method of claim 12 further comprising incorporating the first white light LED and the third white light LED in the same digital camera.

* * * * *